United States Patent
Holmes

(10) Patent No.: US 7,522,163 B2
(45) Date of Patent: Apr. 21, 2009

(54) METHOD AND APPARATUS FOR DETERMINING OFFSETS OF A PART FROM A DIGITAL IMAGE

(76) Inventor: David Holmes, 55 Upper Bartlett Rd., Quaker Hill, CT (US) 06375

(*) Notice: Subject to any disclaimer, the term of this patent is extended or adjusted under 35 U.S.C. 154(b) by 328 days.

(21) Appl. No.: 11/162,070

(22) Filed: Aug. 26, 2005

(65) Prior Publication Data

US 2006/0056732 A1    Mar. 16, 2006

Related U.S. Application Data

(60) Provisional application No. 60/604,880, filed on Aug. 28, 2004.

(51) Int. Cl.
*G06T 15/00* (2006.01)

(52) U.S. Cl. .................. 345/419; 345/420; 345/426; 345/428; 345/619

(58) Field of Classification Search ......... 345/419–422, 345/426–428, 619, 629
See application file for complete search history.

(56) References Cited

U.S. PATENT DOCUMENTS

| | | | |
|---|---|---|---|
| 4,759,074 A | 7/1988 | Iadipaolo | 382/23 |
| 4,866,629 A | 9/1989 | Chen | 362/468 |
| 5,434,927 A | 7/1995 | Brady | 382/104 |
| 5,481,712 A | 1/1996 | Silver et al. | 717/109 |
| 5,495,536 A | 2/1996 | Osbourn | 382/199 |
| 5,497,451 A * | 3/1996 | Holmes | 345/420 |
| 5,649,079 A * | 7/1997 | Holmes | 345/423 |
| 6,064,759 A | 5/2000 | Buckley et al. | 382/154 |
| 6,137,893 A | 10/2000 | Michael et al. | 382/103 |
| 6,262,739 B1 * | 7/2001 | Migdal et al. | 345/423 |
| 6,300,958 B1 * | 10/2001 | Mallet | 345/442 |
| 6,408,429 B1 | 6/2002 | Marrion, Jr. et al. | 717/100 |
| 6,697,535 B1 | 2/2004 | Dutta-Choudhury | 382/266 |
| 6,718,074 B1 | 2/2004 | Dutta-Choudhury | 382/299 |
| 6,734,849 B2 | 5/2004 | Dimsdale et al. | 345/419 |
| 6,751,344 B1 | 6/2004 | Grumbine | 382/154 |
| 6,762,766 B1 | 7/2004 | Nakayama | 345/581 |
| 6,763,148 B1 | 7/2004 | Sternberg et al. | 382/293 |
| 7,191,101 B2 * | 3/2007 | Knoplioch et al. | 703/2 |

* cited by examiner

*Primary Examiner*—Phu K Nguyen
(74) *Attorney, Agent, or Firm*—Robert S. Smith

(57) ABSTRACT

A method for image recognition of a material object that utilizes graphical modeling of the corner points of a vertex which includes projecting a point on a digital display to an inward depth, a one half pixel distance in the plane of the display, with a conic to a digital display, and a square block containing one half size child blocks that are scaled to depth, projecting the corner points of a vertex and replacing the bisecting points of edge features detected in a digital display scaled at an increasing rate of congruency to the dimensions of an object. The method may further include producing a digital image of the material object, providing a central processing unit, providing memory associated with a central processing unit; providing a display associated with a central processing unit; loading the digital image into the memory; defining the edges of features within the digital image; and a finding fight crucial points from registrations projected on to an edge feature display.

19 Claims, 6 Drawing Sheets

METHOD AND APPARATUS FOR DETERMINING OFFSETS OF A PART FROM A DIGITAL IMAGE

RELATED APPLICATIONS

This application is a continuation of provisional U.S. Patent application 60/604,880 filed on Aug. 28, 2004 Methods and apparatus for determining offsets of a part from a digital image.

BACKGROUND OF THE INVENTION

The invention relates to methods and apparatus for determining offsets of a part that are interchangeably described at the two possible projections of depth over a 45 degree oblique and offset the dimensions for projection within and including 45 degrees. The extended edge, comprised of triangulations, the plane of a primitive structure based on primitives of corner vertex elements share a local coordinate axis that has X, Y planar offsets projected in relation to a view plane or larger proportion blocks of features projected in the axis of the view normal. Similarly, the apparent offset within the limit of a 45 degree oblique is projected on the appropriate local axis corresponding to the edge feature triangulation plane.

The invention has application in the fields of photogrammetry, machine vision, image processing, pattern recognition and CAD. CAD is relevant to the invention because by modeling in 3d a CAD system is overlayed on the method in accordance with the present invention to produce powerful modeling capabilities. CAD systems are points in space and the connection to the method of the present invention is that the points are block depth representations. This technology literally and directly connects traditional CAD to real 3d spatial component modeling.

Machine vision includes image processing and pattern recognition. One application is in the field of quality control. For example, the technology may be used compare manufactured parts to a standard. Other applications are in the field of security and surveillance. For example, the technology may be used to compare respective video streams to identify differences. Similarly, the technology may be used for face recognition. Because edges are surfaces, digital animation of recorded faces including movements is applicable to manufacturing process for detection of flawed parts and particularly where it is desired to provide a means for measuring rapidly changing dimensions on irregular shapes.

The technology also has application to entertainment systems that allow the players to step into the screen with the employment of simple digital cameras. The medical field includes many possible applications such as analysis x-rays, mammograms and magnetic resonance images. Similarly, the technology has application to fitting prosthetic limbs, hearing aids to ears and dentures to a patient's mouth.

The technology has application of wide variety of other fields including but not limited to sheet metal fabrication, custom auto quality control, HVAC, boat building, custom canvas work, designer fashion garments, architectural contracting, and cabinet making.

The prior art includes techniques utilizing lasers. For example, one such application is in the manufacturer of Boeing jet aircraft. The techniques are very effective; however, they require tremendous labor for set up and for maintaining Cartesian dimensions. In smaller shops everything is done by hand. Parts are fabricated and trimmed manually. In various manufacturing processes, lasers are used with limited success. Manual optic devices tend to be the norm. These are again made for maintaining rigid alignment. The L.S. Starrett Company of Athol, Mass. manufactures video measuring systems sometimes referred to as Galileo vision systems as well as optical measuring projectors. The systems depend on extremely stable and meticulously aligned components depending on the summation of dimensional deviations being based on single points in space. These machines measure to the limits of the effects of heat induced material expansion into tolerances as high as $1/10,000$ inches. The Starrett Galileo Vision System (www.starrett.com/pages/362_video_measuring_systems.cfm) has formidable resolution but requires an intensive manual alignment procedure. Accordingly, limitations are placed on production speed and part size. The Starrett Optical Measuring Projections described at www.starrett.com/pages/691_optical_comparators.cfm. is a 2d measurement system and has similar qualities to the Galileo system without z detection. The web page shows no data point assimilation related to anything described in this technology. The Starrett system relies solely on direct mechanization to achieve measurement results.

A major problem with the prior art methods is that the step between design to rough cut material requires tremendous labor to manually finesse into parts that are formed to acceptable manufactured specifications. This is not an easy task because no method exists for directly comparing the design from a computer into the real 3d part dimensions. A particular problem exists in measuring edges. Further, the simple industries where computers cannot be of assistance vastly benefit from a base line of dimensions that would be gotten with a simple digital camera.

Java graphics language calls are in the prior art. Java affords degrees of freedom to points in space. Orientation is not accounted for in points. Coordinate systems are fixed at a predefined location. The inventor of the method and apparatus described herein is also the inventor of the method described in U.S. Pat. No. 5,649,079. An interesting parallel to Holmes U.S. Pat. No. 5,649,079, outside of the edge feature detection method, is that the surface grid in the patent shares symmetry with the projection of edge features in depth. The same symmetry provides the basis for generating the grid. Removing one triangle lets the remaining triangle be located in the digital display depth. Also by embedding a triangle in a block of space the stringent requirement for isosceles configurations is reduced. Outward projection in the spirit of Holmes U.S. Pat. No. 5,649,079 is still clear. The registration of image features to the volume solids and primitives of Holmes U.S. Pat. No. 5,497,451 correspond in sequence and pattern. However the use of these primitives to mitigate perspective and reversibly determine edge depth is a new concept that is a part of the present invention.

Java graphics language calls are described further at http://java.sun.com/developer/onlineTraining/java3d/j3d_tutorial_ch1.pdf page 11 shows a virtual universe FIG. 1-2 First Scene Graph Example. View contains a physical body relative programming technique here. This technology fits in between the two because there is a space implied as shown in FIG. 9 with projections into the screen at a finite space in otherwise infinite Windows projection. The physical environment is the extension of the physical body to a new machine scale. The space behind the screen and the scaled new views are the concepts this technology utilizes.

SUMMARY OF THE INVENTION

In contrast to the known art, it is an object of the present invention to measure parts in a manner that allows a manufacturing process to maintain lower tolerances. More particularly is an object of the invention to provide a process that is limited only by the resolution of the digital camera expense and which has excellent scalability to higher resolution.

Another object of the present invention is to allow concurrent refinements to be cross checked with a design prior to assuming a refinement machining operation to be necessary. Additionally a CAD model is also feasibly developed from a repetition of images.

Still another object of the invention is to provide software that aligns itself to the part 3d space automatically eliminating costly setup time and expensive equipment, i.e. lasers.

Yet another object the invention is to provide a method and apparatus that is easy to use and dependable.

A still further object of the invention is to provide industries manufacturing relatively simple parts with apparatus and methods which will vastly benefit from a baseline of dimensions that will be done with a simple digital camera and thus will replace laborious manual alignment/calibration with electronic facsimile of a human eye handling multitudes of offset comparisons. The advantage is that the multitudes of offsets in the form of spatial curves of locations where a part feature need be altered to preliminary design or concurrently altered specifications. In a useful application the camera images are records of features that provide a benchmark for the rate of change alterations that affect the dimensions of the material part. With the opportunity to check parts to another mating feature of an existing part or the remotely accessed CAD representation alterations during machining dimensional checks are supported from any useful location, position, and time matched concurrently for maximum accuracy. An elegant example is the manual prototype fabrication of the composite material structural components of the new Airbus Jumbo jet parts being hand laminated and having this technology applied in monitoring the proper dimensions of the pre-cured parts. The parts are uncured and cannot be touched without serious deformation. A simultaneously cross reference to the CAD design, curing shrinkage offsets, and actual mating part features readied at a remote site far from the English wing components production site according to a 2004 Wall Street Journal article would have been very useful. This is simply the virtual assembly of multiple components where in the fabrication process itself the lay ups of composite material are as easily monitored in all of the contexts described here that would improve quality assurance rates by the substantial magnitudes of improvement.

Another object the invention is to eliminate the costly requirement of setup time for traditional mechanical probe gauges.

It has now been found that these and other objects of the invention may be attained in a method for image recognition of a material object that utilizes graphical modeling of the corner points of a vertex which includes projecting a point on a digital display to an inward depth, a ½ pixel distance in the plane of the display, with a conic to a digital display, and a square block containing ½ size child blocks that are scaled to depth, projecting the corner points of a vertex and replacing the bisecting points of edge features detected in a digital display scaled at an increasing rate of congruency to the dimensions of an object.

The method may further include producing a digital image of the material object, providing a central processing unit, providing memory associated with the central processing unit; providing a display associated with the central processing unit; loading the digital image into the memory; defining the edges of features within the digital image; and defining fiducial points from registrations projected onto an edge feature display.

In some cases the method further includes overlaying perpendicular axes to a line through a pair of fiducial points; and setting projection points on the intersection points of the perpendiculars and edge feature intersections. The method may also include separating the relative offset of the overlaid edges into levels of deviation, calculating the arc quadric angular offset from the base case conic arc data and projecting this data onto a display screen, calculating a cubic in screen depth offset from the combined offset of two database conic arc data, and producing a two-dimensional offset of a pair of image features perpendicular to intersection points on an edge feature. The method may include manually selecting the midpoints of a detected edge.

Other forms of the method include calculating the offset of the projected features of the half edge decomposition directions of symmetry, locating the position of the normal distribution of the perspective distortion on the image edge features, removing the perspective distortion offset, increasing the incline deviation about the symmetry of the normal distribution, sorting maximum deviations and highlighting least deviations, and using the position and orientation of the detected edge features to identify a primitive on a display. The term "primitive" as used herein refers to one or more blocks of objects described by edge feature points.

Some forms of the method also include determining projection repeatable pattern of block edge features with detected edge feature blocks, comparing database primitive blocks to the pattern of this image edge feature or block to provide an affine transformation, expanding the node space and child elements holding primitives hidden feature contained in child elements as increments of primitive patterns to common based parent, defining block convergence holding coordinate axes and align orientation that fits within the surrounding volume context of the base case primitive blocks, and separating nodes of primitives into composite volumes.

Additional forms of the method may include reducing the complexity of primitives with respect to existing base case linear depth, scaling block to one half increment of features projected on centroids of comparator features, detecting multiply connected regions from the overlay node connectivity, translating comparator box to positions relative to volumes, converging block centroids to outer triangles, and qualifying the translation on two-dimensional block topology. This method may further include the steps of grid surface edge features, calculating the right angle line of sight on triangle axis; and qualifying the inward projection Some forms of the method may include manually adjusting fiducial points utilizing an interactive computer display. Some forms of the method may include setting projection points on the intersection points of the perpendiculars and edge feature intersections; and setting to local Cartesian coordinate axes at both intersection points. Other embodiments of the method include using the position and orientation of the detected edge features to identify the primitive on a display.

The invention also includes the method for measuring the dimensions of a material object by graphical modeling of the corner points of a vertex which includes providing an electronic computer, the electronic computer including a memory having stored therein instructions and data for performing steps (a)-(b); performing the steps (a)-(b) by means of executing the instructions and data within the computer; (a) projecting a point on a digital display to an inward depth, a ½ pixel distance in the plane of the display, with a conic to a digital display, and a square block containing ½ size child blocks that are scaled to depth and (b) projecting the corner points of a vertex to be coincident with the bisecting points of edge features detected in a digital display scaled at an increasing rate of congruency to the dimensions of an object.

This method may further include providing instructions and data for performing steps (c)-(g) in the memory in the computer system: (c) producing a digital image of the material object; (d) providing a display associated with the central processing unit; (e) loading the digital image into the memory; (f) defining the edges of features within the digital image; and (g) defining fiducial points from registrations projected onto an edge feature display.

The method may further include the step of providing in the memory of the computer that further includes instructions and data for performing steps (h)-(j) in the computer system: (h) overlaying a perpendicular axes to a line through a pair of fiducial points; (i) setting projection points on the intersection points of the perpendiculars and edge feature intersections; and (j) separating the relative offset of the overlaid edges into levels of deviation. The method they also include providing memory that further includes instructions and data for performing steps (k)-(q) in the computer system: (k) calculating the arc quadric angular offset from the base case conic arc data and projecting this data onto a display screen; (l) calculating a cubic in and out screen depth offset from the combined offset of two database conic arc data; and (m) producing a two-dimensional symmetric offset of a pair of image features over the half edge decomposition directions of symmetry; (n) calculating the offset of the projected features of the half edge decomposition directions of symmetry; (o) locating the position of the normal distribution of the perspective distortion on the image edge features; (p) removing the perspective distortion and increasing the incline deviation about the symmetry of the adjaceny; (q) sorting maximum deviations and highlighting least deviations; and using the position and orientation of the detected edge features to identify the primitive on a display.

BRIEF DESCRIPTION OF THE DRAWING

The invention will be better understood by reference to the flow chart at the end of the specification and the accompanying drawing which includes.

DESCRIPTION OF THE PREFERRED EMBODIMENTS

Figure 1C:
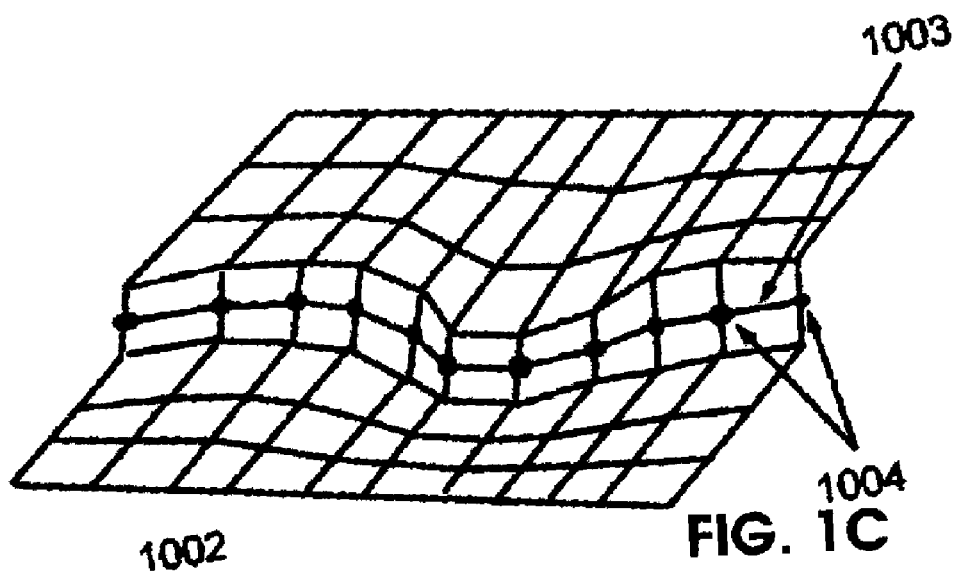
FIG. 1C is a diagrammatic view of a grid that locates the points comprising the edge features 1003 between contrasting blocks 1005 to 1006 of FIG. B to the linear location 1004 between pixels on a display.

The method and apparatus in accordance with the present invention achieves image recognition wherein profound accuracy is achieved particularly in relation to any manual fabrication operation because measurements are made relative to existing features eliminating costly alignment processes. Aircraft components have magnitudes of features where relative overlays of digital images would further utilize the relative dimensioning of close up pictures providing high resolution from a plurality of vantage positions. The airbus example of the measurement of wet composite curvilinear components emphasize the ease of application of this technology by eliminating manual alignment required by traditional touch probe produces such as those offered by Starrett. Another example of fabrication deals with the necessity to get alignment in the form of square and cubic spaces. Custom sheet metal, HVAC, and kitchen cabinet installation would be greatly enhanced by facilitating the measurement of parts to an orthogonal datum. The datum is never actually defined by the user. Instead an approximately matching CAD model is roughly aligned in a camera view with relative offsets subsequently refined by digital camera overlays. The practical advantage to this is the user of this technology reduces camera usage by specifying critical dimensions to scale on an intermediary CAD model into a virtual location. By doing this simple command action using conventional measuring devices, like a tape rule, a relative orthogonal datum is made for basing additional computer measurement operations to build continuations of datum features. When a part is in an extreme state of offset the case is obvious and useful due to overtly excessive deviations in dimensions. In applying the reverse to the time element curve space of this technology the summation of offsets are the measurements of the deviations in the overlays of digital images based on the virtual relative datum. The reverse application of the digital image measurements is a construction datum that is compatible to a Cartesian space of a CAD model that is comparable to an existing CAD model or a paper design thereby skipping otherwise laborious manual measurements of the departures between the digital images and the CAD model.

Ship building and custom jewelry making share a common character in CAD synthesis of space embedded in curvilinear digital image overlays. Both disciplines have a traditional image description of part features comprising a product offering a relative datum in curvilinear space. Maintaining the design integrity is done with the user selecting planar views that form orthogonal cross section datums that each has a reference in the evolving part. As convergence of the typical slowness that these two categories of fabrication proceed at the two layouts of geometry are manifested in three dimensional space by the inclusion of multiple components at critical junctions. With the measurement and subsequent reduction of interference between features to high tolerances, the outer extremities of parts are located accurately in any dimension. From another location and camera view additional multiple part features are built to even higher tolerances regarding design intent due to the limit in real life dimensions. The interior of a boat hull or the hole of a ring dimensioned for cooperation with the finger of a human are examples of reference geometry. Eventually, in either a boat or a piece of jewelry rectangular standard features are desired by persons where the techniques of the sheet metal and kitchen cabinet installation are employed to finish each product with shapes that act to transform curvilinear dimensions to orthogonal reference axis that people find aesthetically pleasing.

The software aligns itself in a way that is the outward projection of a feature described in useful combinations of shapes to the part 3d space automatically eliminating costly setup time and expensive equipment, i.e. lasers so that a highly accurate system of measurements are maintained.

The apparatus and method in accordance of the present invention is characterized by three properties, namely, reversibility, scalability, and symmetry. CAD/designs are substituted with the measured material parts. Similarly the parts are substituted with the design. Either direction of comparison is the same with an identical software format representation of the pairs. Camera locations are freely set to the most advantageous image focal point. Scalability is the increase of resolution in moving from one digital imaging device to another. Regardless of variations in pixilation, accuracy is maintained across devices. Last is symmetry which is the apparent result of the software rotating space to fit the translatory offsets of part features. Coordinate systems are free to rotate where any number of axis are reset to the specific offset.

A major advantage of the method and apparatus of the present invention is self alignment with respect to all three properties. In fact the two edge features representation of the part and design (or base part) are only approximately aligned with simple user mouse clicks. Relative offsets are projected in depth where perspective distortion is mitigated by the same apparent 3d feature overlay process.

a.) Prosthetic Leg Example

The following prosthetic leg example of the method and apparatus in accordance with the present invention will illustrate the concepts involved in the method which will be implemented by apparatus that includes a computer that includes a microprocessor and memory and which cooperates with software that is commercially available or within the skill of practitioners in the programming arts given the flowchart and description herein. The software in the preferred embodiments functions in accordance with a flowchart herein. The numerals referred to in the following example correspond to the numerals used in the flowchart that is part of this application.

A patient presents with a prosthetic leg mounted on the stump of the patient. Relative movement between the leg prosthesis and the stump result in pinching of tissue on the stump. The pinching is most acute and at the end of each stride.

The sequential steps involved in the method in accordance with the present invention include:

Take digital images of various stride positions with the artificial limb.
Clean out the background noise (100).
Define the edge features (200).
Register the primitive features of the limb to determine the approximate depth (600).
Project the edge depths (375).
In the case of encountering new features build the features from the primitive db (475).
Continue projecting the edge depths (375).
Make overlays of the limb features (500).
Get the offsets on the edges (300).
With the largest offset projection distances find where the highest rate of limb distortion is over the series of images.
Trim the material accordingly.
Reiterate the process for final check.

b.) Sheet-Metal Example

The steps involved in a sheet metal example where a customer wants a peaked copper roof with 4 curved seams over a cupola frame.

Take digital pictures of an existing house. The cupola roof structure from the existing house framework is the first digital image for beginning the cupola addition. An interesting feature of this case is that the house frame orthogonal space is a basis for finishing the roof with a curvilinear copper structure. Drawing the position of the cupola onto the existing house framework provides a virtual datum for building the structure remotely. Curved copper roof covering material is then digitally modeled as the rough cut material is fabricated. The projection of the lines onto a design that is either paper or a CAD model is the reverse application of the shipbuilding jewelry model since the conclusive curvilinear fit would be checked against the initial house photographed datums.

Clean out the background noise (100).
Define the edge features (200).
Register the primitive features of the frame (600).
Project the edge depths (375).
Make overlays of the frame features (500).
Project the frame features on the overlays refining the base case model (500).
Check the base case for convergence to real 3d frame with relative dimensional offsets (325).
Write the edge features to a CAD system as the first plan diagram of the job.
As the cupola copper roof is being built the same method is employed to measure the fitted pieces to each other.

c.) Custom Canvas Example

The process is further illustrated by a custom canvas example. Conventionally, craft persons are forced to travel long distances to simply cut fabric to the shape of a unit to be dressed in canvas. In consideration of the fact that cloth moves and distorts easily, perspective has to be mitigated in a sequence of steps altering focal points from 2d into 3d. The steps involved include:

Build models of the covering area as in example b).
Draw the cloth product design in a CAD package to the dimensions of the base area to be covered.
Use the steps in examples a, b where appropriate. Because cloth is two dimensional in nature, check the offsets of the hemmed components to the design.
Build a model of the assembled 2d features as in example b).
Check the offsets (300) with overlays (500) as in example b).

d.) Architectural Contracting

A contractor wishes to place windows in a building wall so that the locations are square to the original structure. The sequential steps in the method of the invention are:

Draw the window locations onto the wall of the structure.
Take digital photos of the window and house.
Eliminate the background noise (100).
Define the edge features (200).
Install frames in the locations of the drawn window outlines.
Take digital photos of the windows
Eliminate the background noise (100).
Define the edge features (200).
Manually align the window edge features with the drawn outline edge features.
Use Example a steps to verify position is correct. (500, 300)
Save the window locations.
Take digital photos of the frames.
Eliminate the background noise (100).
Define the edge features (200).
Read the previously adjusted window edge features into the window.

Use Example a.) above to determine the fine trim work to secure the windows to the frames in symmetry to the house.

e.) Restoration of a Boat Hull Example

The deteriorating hulk of a one time classic yacht has a remarkably high value. Restorations are popular because expenses are easily recouped on selling the restored boat. The challenge is in restoring the shape to a smooth form on both sides of the hull. This example is strikingly similar to the first example a.)

In simplified terms the steps are:

Use masking tape to mark the sections of the hull matched on both sides.

Take digital images of the sheer and taped sections. A section is a cross section of a hull at various typically equally spaced locations. Taping allows a builder to more or less maintain dimensional accuracy any where on the hull, if the sections are projected parallel and perpendicular, thereby maintaining the orthogonality.

Use the steps in Example a) to determine the deviations between hull section pairs.

Physically alter the hull form to modify the longer offsets so that the sheer conforms to the section profiles at common points of maximum deviations.

Reiterate the process until offsets are minimal.

The invention provides apparatus and a method for image recognition that utilizes graphical modeling of the corner points of a vertex. This modeling of the corner points of a vertex is achieved by projecting a point on a digital display to an inward depth, a ½ pixel distance in the plane of the display, with a conic to a digital display, and a square block containing ½ size child blocks that are scaled to depth. The corner points of a vertex are projected bisecting points of edge features detected in a digital display scaled at an increasing rate of congruency to the dimensions of an object.

The apparatus and methods in accordance of the present invention combine edge detection with mesh generation. A digital computer is programmable for quantifying dimensions of a representative image. This method may not be limited to the utilization of the above inventions. The U.S. Pat. No. 5,497,451 contains pattern descriptions that are highly orthogonal and useful in determining depth measurements. Holmes U.S. Pat. No. 5,649,079 describes an apparatus and method that does a good job at modeling edge features. In general the Holmes U.S. Pat. No. 5,497,451 is actually reduced to a point depth element contained in a box representing depth. Therefore, the described primitives are a useful intellectual conveyance where the corner point vertices in the shape are the determinant contained in a volume array of a greater than 45 degree conic depth dimension. Additionally the symmetry of isosceles triangles of Holmes U.S. Pat. No. 5,649,079 is not required in this method because the recognition of tangential projections defines depth with edge feature comparisons very accurately.

There is one important similarity of this invention with the disclosure in Holmes U.S. Pat. No. 5,649,079: Using triangulation to generate surface grids in the geometric representation is a useful method of having computers, including digital devices, communicate with each other using agents. On three distinct levels of sensing, effecting, and communicating a digital computer becomes very efficient. One of the three characteristics of an agent is completely utilized automatically. Additional software and astute programming makes this agent feature strikingly useful. Agents are briefly mentioned in the Holmes U.S. Pat. No. 5,649,079 patent at column 4, line 55; column 7, line 44 and column 8, lines 23, 27. Here the main difference from the existing patent is that the HHB and BBH agents, called primitives in the description, are expanded to include a very general body of shape configurations outside the description of a single triangle. Existing software packages are tied together by this invention communicating in a context of the available information combining Adobe Photoshop with TurboCAD as BBH as being in the display screen to HHB as being a depth into a display screen. Useful manufacturing shapes are projected through a data base from CAD back to the GUI digital image so that each new incoming image becomes the representation of increasing accuracy. More precisely, this invention through design supports common methods of photogrammetry on a very practical level and can combine many exacting methods concurrently in the same context as combining digital imaging with CAD.

It will be understood that surfaces are edges which are projected over shapes (primitives) in integration resulting in edge detection shape recognition that accomplishes this with projected triangles automatically. Large amounts of data processing in animated video hardware tied to a data base supporting shape recognition. There are two implications here. Registration of object data is accurately done to an interpixel level. This is counter intuitive in conventional approaches of getting the whole feature measured. This technology uses detected edge features calibrated by the pixilated image to determine the location of a data base feature. Including animation video technology provides another facet to this invention's usefulness by measuring the time rate of change in a feature to qualify the object as the change in the rate varies. A practical topology certainly exists in U.S. Pat. No. 5,497,451 because the effects of perspective are factored out by scaling. This process converges beyond a pixel in equal proportions to the adjacent pixels. U.S. Pat. No. 5,497,451 is hereby incorporated by reference The multiple tiers of accuracy of the method in accordance the present invention provide support for real time parallel processing. Thus the process in accordance with the present invention is equivalent to multiple part interference analysis. The animated qualification of overlayed digital features is registered to an assembly of evolving feature positions ultimately determined to a valid rendition by the limit of a single user specified tolerance.

A capacity to define pixels on an interpixel level with accuracy is the basis for generating surface grids over the edge features found to describe objects represented from a database. Measuring depth is done in real numbers and becomes an offset to the display registration". Registration on the screen is calibrated by the projected record of depth.

The description of the apparatus and methods in accordance of the present invention will be better understood by reference to the following reference documents that are known to those skilled in the art:

[1] A First Course in Continuum Mechanics, Second Edition pg 52, Y. C. Fung Second Edition Prentice Hall, Inc. Englewood Cliffs, N.J. 07632

[2] Kinematics & Mechanisms Design pg 47 Chung Ha Suh & Charles W. Radcliffe, Robert E. Krieger Publishing Co. Malabar, Fla. 32950

[3] "MAG-Mesh Automatic Generator" IASTED Jun. 26-28, 1989 Byzmek, Holmes

[4] "Generalized Method of Decomposing Solid Geometry into Hexahedron Finite Elements" Proceedings 4th International Meshing Roundtable, 1995

[5] U.S. Pat. No. 5,649,079 Holmes

[6] "Causality" pg 203 Judea Pearl C, 2000, Cambridge Press.

[7] U.S. Pat. No. 5,497,451 Holmes

[8] "Elementary Differential Equations and Boundary Value Problems" William E. Boyce, Richard C. DiPrima

[9] "Mathematical Theory of Elasticity", Sokolnikoff 1983, McGraw Hill

U.S. Pat. Nos. 5,649,079 and 5,497,451 issued to the applicant herein are incorporated herein by reference. The following discussion will refer to these nine reference materials periodically to provide a better understanding of how to practice the present invention. Such references will be made by inserting a bracketed number in the following text. For example, [1] will be understood to refer to A First Course In Continuum Mechanics, Second Edition pg 52, Y. C. Fung Second Edition Prentice Hall, Inc. Englewood Cliffs, N.J. 07632.

This invention includes a device for recording three dimensional space made from a digital computer combined with a digital imaging device. In reducing the number of digital imaging cameras, a similar reduction is achieved in the amount of data utilized when building a computer digital model. A camera is held for talking a picture recording of a material object that is first rendered in two dimensional space. Subsequent images quantify the three dimensional parameters of the object image in terms of dimensional accuracy of the object. Having both a means to model a computer representation of a material part within dimensional offsets compared to a standard part or similar virtual computer model fully provides an accurate basis by which a difference or time related deviation is measurable. Computer software is used to fabricate edge outlines of a model shown in a digital image that readily contains virtual forms for rapidly recording spatial attributes.

Industries that have applications where the concurrent ability to measure spatial modifications during a material process are computer animation, fabrication, manual prototyping operations, medical devices, artisans, and craftsmen. A capacity to simultaneously quantify the deviations of a material object from an intended dimensional model with a plurality of datum points is beneficial for detecting flaws. Finding the minimum and maximum deviations from a comparison with a base case allows for part modifications that are true to dimensional parameters. Digital images are the basis for verifying an alteration to a virtual model prior to making the changes on a model of both a part or another computer model.

The following description will be best understood by reference to the accompanying drawing including FIGS. 1-5.

A range of fabrication cases from relatively intuitive to sophisticated fabrication techniques are portrayed by the core image acquisition, generated model features, and fiducial point overlays producing model details. Outwardly, these steps are effectively carried out in an inexact environment. Camera orientation is made manually only requiring that the feature be contained in the image. Model features are automatically derived in terms of small cubes that contain details of features at an interpixel level. With overlap of the image in successive cube structures that contain varying degrees of self aligned entities representing part feature edges are recomposed into a model in having the correct position. At the point where the edges are generated the cube structures are available for constructing solid models. Facilitating the development of recognizable features to refined offset measurements is a manual operation of selecting alignment reference points. Fiducial points 3001 are approximately located on the detected edge features by either user mouse clicks or automatic placement. Placement is two dimensional regardless of the true physical depth of the features at the approximate position of edge point locations. Offset dimensions are modified in the two dimensional view. Subsequent three dimensional modifications are made within the next image limited number of combinations of feature locations for determining the position of edge features permitting a likewise rapid construction of a model. An offset of the available virtual model space is rapidly available for measuring spatial dimensions from the three dimensional perspective with fewer camera images than typically used.

The use of isosceles triangles [5] FIG. 6j, ½ depth of brightness in edge detection 0 1005 for dark with 1 1006 for brightest, and convergence of the Fourier Series pg 535, [8] on a smooth function at $[f(x+)+f(x-)]/2$ are symmetric within ½ pixel 260 accuracy. Regardless of the edge feature orientation the pixel distance at ½ allows the refinement of edge features to be smooth avoiding the jagged jumps of discontinuous edge contours. In practice the measurements made on a recorded computer model are highly effective in determining deviation from known part examples or other computer models. Against the background of blocks that were used to refine the edge features found in 260 existing secondary non edge features are removed 270 for producing a clear feature record 2000. Remaining features are triangulated followed by segmenting 1003 the outer triangle legs along the detected edge feature. Segmentation is small relative to pixilation. The triangles within the blocks 240 used in edge refinement ultimately are contained in block primitives [7] FIG. 31.D (500) as the residual history 1000 of edge detection preserved for projecting the depth of the edge features. These same histories of blocks 1001 facilitate the application of causality [6] in using blocks to separate edges from spurious lines as with gray areas bounding features where the triple has direct reference BBH, HHB of reference 5 and is particularly helpful in determining edge locations 1004 in fuzzy images being able to assume that an edge detection history exists at a convenient feature location [6]. Enough information exists with a layer of blocks on the image to mechanically eliminate unwanted details.

Edge features are dimensional representations of a digital image. A comparison of two features produces an offset 345. Each relative offset 3003, 3004 has a local Cartesian coordinate axis 3009 associated with it and is one of a multitude of axis on the edges of a model. Perpendicular to the fiducial axis between fiducial point pairs 3002 are two coordinate axis 345 pairs that determine the direction and magnitude of the feature offset relative to a new incoming comparator 3010 model. By definition of the fiducial points 301 being approximately located on opposing edge features, the origin of the coordinate axis are also arbitrary and are selected at the base case 3011 edge features. A corresponding fiducial point pair is selected on the comparator model edge features. Two operations are available. The projected alterations of the base case original model at right Cartesian directions maintain an accurate continuation of orientation. Physically measuring the part to verify the offsets is also easily done on any coordinate axis relative to a convenient part space. A digital camera in a convenient location works well in recording dimensional attributes of a part.

The locations of Cartesian coordinate pairs on base and comparator models determines the vector direction of offsets between a pair of images. It is an accurate comparison due to the coordinate locations being a conic arc quadric [9] pg 16, as it approaches infinite radius. The rotational degree of freedom comparable to spin of the features around the chord of an infinite radius arc is unconstrained until a radius is detected on an edge. Once an arc is detected the orientation of the local coordinate systems are fixed on a multitude of arcs projected 385 from the part edge feature. Depth is managed between base and comparator models as the small rotations of each coordinate axis that produce a negligible dimensional offset quantified by projected point tangents to a base line [5] FIG. 17.*d*. Data base conic arc forms are easily stored and generally applicable to a wide range of arc orientation.

This device is manually started by selecting recognizable image areas with a user controlled device from the digital display. The half distance on an edge feature is also compatible for determining depth of a feature. Placement of fiducial point pairs 301 along an edge for subsequently determining offset for large radius arc forms is highly accurate given smooth edge detection and interpixel 375 accuracy. Also, when these edges are no longer arcs and are straight lines joined at a corner vertex the fiducial point pair axis orientation can have a large vertex depth offset in or out of the display. The equivalent bisecting axis between the fiducial points centered at the vertex point is the 45 degree between an imaginary and real number space. Either a leg is higher, lower, and by round off never neither leg being congruent at the same depth. The offset projected differences are therefore a function of depth displacement where the vertex has an automatic depth associated with it. Depth is unconstrained.

Combining edge depth detection on an arc, corner, and block edge feature removal methods result in the definition of primitives [7] FIGS. 10-12, 475. Offset line segments comprising the edge features become Simpson integration, [3] FIG. 3, that mark the location of readily detectable three dimensional primitives in the bounds of image edge features FIG. 5*b* [4]. Provided is a unique basis for extending the offset projections into the depth of an image display using blocks of primitives 4000 that readily describe the arrangement of features in space.

Given the freedom available to measure objects with a camera a degree of compensation from spurious offsets resulting from perspective is needed 445. Perspective is cubic 3008 and the same form for all focal points. Having the normal bell shape curve allows easy identification and removal of the largest offset 3007 from a plurality of like offsets. Offsets are relatively described as a minimum 3005, average 3006, and maximum 3009 offset eliminating numerical stringencies for recognizing perspective.

An advantage is had by using a mathematical relation that describes the accuracy of a digital camera making an image of a part feature. A reversible spatial feature described by f(x(f ([T], [A])→f([A], [T]))), lim x→0 is defined in a digital image on a plurality of locations where the direction cosine of angles $$2.6\text{-}1 xi = \beta ij\, xj \text{ and } 2.6\text{-}2 \beta ij = \cos(xi, xj)$$

[1] pg 52. is defined by two stages of two orthogonal rotation matrices.

A first half of the function permits an approximate alignment of a general block structure representation of edge features. First orthogonal matrix e.g. 3.3, 3.4, 3.5 [R][2] pg 47 is the 467 edge offset recombined into a volume array model of primitives [7] FIG. 29. Continuation of the recomposition of primitive arc features is the breakdown of primitives to particular edge features constituting the second application of [T]. Contrary to the effect of size the blocks or Voxels containing the edge features are still being aligned in a first [T] matrix approximation [2]. This matrix can be used coarsely. The projection of the edge features is the measurement of the least projected tangent angle difference 499.6 of an image feature contained in a data base block set 499.5. Actual location of the feature block centroids is trivial because the block corners are relative to the previous larger parent blocks [7] FIG. 7*d*. 401. Which is also a relative measurement by virtue 499 of the multitude of primitive feature blocks. A higher level of accuracy is still available because the centroids of the features held in the edge triangles 4002 only approach the actual edge that has not yet been measured.

Alignment of a topological quality that is the quantification of matching blocks 4004 that share as close comparison of edge and surface features are further refined to within the parameters of a volume comprised of primitives [7] FIG. 35-47E. Discrepancies are eliminated by shifting primitive element references corresponding to a configuration of more compatible primitives that have a generic equivalency [7] pg. 20; col 25-36. By the relative character of projecting feature depth as a generic alignment of a projected approximate depth of edge features, the three dimensional qualities of a detected object are made relative to a readily adaptable data base model. Edge features are independently projected to a degree of depth already in step 375. Any spurious direction of the edge features is reproportioned to fit the depth gradient of the appropriate block element.

Not all apparent edge feature configurations readily fit the available volume arrangements of primitives. A means by which a group of detected edge features are brought to a more complete fit is to reduce 515 the complexity of primitives to the simplest case of being cubes in the form of apparent parallelograms[4] FIG. 7, 8. Two outcomes effect the description of the image feature alignment of 497 and 499 within the framework of generic alignment. The edges regardless of the configurations take on at least a temporary corner vertex representation 5001. Additionally the resolution of the model increases because the orthogonality of the blocks becomes synonymous with the blocks 4005 of the 200 edge detection methods. Even in generically matching primitive blocks on a generic volume relation, the edge features from a digital image gradually become equivalently aligned because the direction of the view plane is completely unconstrained. Data simplification in reducing geometry to a parametric approximation of a cube leaves the object view plane to freely point either in or out of the digital display.

The image edge features that are reset at positions in the comparison to the refined data base model are scalable to within the relation of the block parent child hierarchy. In the block structure [7] FIG. 31*d*, edge features exist on the periphery of the blocks. All translations adjusting the relative location of features are modified 516 with half (½) the apparent magnitude of any offset. By the symmetry used to describe the view plane of a model the calculated transformation of a relative block feature location is sufficiently calculated to be within ½ the location of a comparator predefined block hierarchy typically being a size of the apparent block in the image. Depth is scaleable in the z plane for each feature to a gradient of in a minimal number of digital image overlays.

Combining the binary possibility of the z plane direction 515 with the ½ magnitude scale factor makes possible to assume that the multitude of arcs exist in predetermined positions 517 relative to the base case data base model. Having a condition for quantifying feature location as the projection of peak point triangles facilitates calculating the location on a portion of an edge feature in an arbitrary coordinate axis position. A temporal element of determining the position of the feature extremities is the description of the direction cosine angle transformation using individual triangle planes that although are arbitrarily located in space contain a local coordinate axis. Accuracy is high with the continued use of the practical common orthogonal transformation matrix e.g. 3.3, 3.4, 3.5 [R][2] pg 47 to scale features to a location based on successively smaller edge feature triangles.

Dimensional offsets produced from manually or automatically aligned fiducial locations determine the position of primitives in an image. The simplifications 520 connected region with holes. The connectivity of the detected features start and end at the same point verified in the step 557 by measuring the distance between two end primitives in a block structure. The effect is a wrapped around solid [7] FIG. 59.

Two decisions when selecting primitives from the data base of features are available to determine what a set of image features represents. Generic and real geometric comparisons provide the means by which the steps in generating models from overlays 500 are iterative. A generic selection is made prior to the full geometric determination of labeling an image feature with the distinct structural hierarchy of a block of primitives. Going from generic to geometric qualification is reversible. Limits to how complex a group of edge features are provide conditions for measuring the likelihood of a region being a generic type out of the view of the current image features. The translation of the resulting geometric form is represented by the rotation [T] reference e.g. 3.3, 3.4, 3.5 [R][2] pg 47 matrices that have orthogonal properties of block primitive right angled hexahedron elements [4] pg 150, 151. Secondly, the remaining translatory parameters are the x, y, and z translations that at first determine offset subsequently followed by depth projections in the image overlay. Multiply connected regions 540 containing holes and pockets are a subset of the process where the blocks in edge detection are arbitrarily made 200 in an initial view and the hidden features that exist are representative of the future manual camera positions outside of the requirement of alignment other than camera focus on the part.

Reduction of the edge feature triangle sizes brings the line, centroid 4001, and peak point to congruency 556 in the view plane. Blocks that describe the coarse registration of the image to the base case model in 497 to 499 become very small in the pixel view while still being representative of the Cartesian [T] reference e.g. 3.3, 3.4, 3.5 [R][2] pg 47 transformations that initiated coarse registration. A useful result is the strong analogy to pixel space in blocks becoming representative of RGB color and brightness attributes. In quantified pixel coloration as a qualification of general features seen in an image a useful degree of machine vision is attained. In addition an advantage is gained in that the process of identification is reversible on all three axes in the context of a pixel becoming a block 4005 and block being the quantification of a pixel. Depth is quantified over the two dimensional digital display from the detailed edge feature segments in the larger generalizations of an image. Both are interchangeable in a strong identity providing means by which significant measurements are made practical in two dimensions.

A means to "know" depth is useful for making measurements and binary transformations. Inductive logic is available in a form of qualitative decision making quantified by the numerical accuracy from using the relation of the function that encapsulates 557 cosine angle matrix accuracy. Comparisons made directly to the database base cases HHB [5] are generalized as in 556 with an additional numerical measurement of transformed location. The quantitative depth of a feature is made by measuring the relative location of a coarse block 4000 alignment and refined feature projection 517. Depth becomes generic identical to hidden line detection and a real number space. Orthogonal applications of the [T] transformation matrix [2] are available in at least two of the three dimensions used to calibrate space. Disjoining the third axis from the numerical calculation is a degree of freedom of 515 brought to a reversed calculation of the block space over the 516 image edge to within block feature range induced from coarse and refined projection measurements. Depth is the projection of features on the free disjointed third dimensional axis 4006. The framework exists for a condition to measuring space presented by one or more digital images.

The inductive logic of 557 is applied at the edges of the model in determining the translatory projection of an outward offset expansion of a feature edge section. Projections are described in 425 in apparent two dimensional spaces. At this point in the process the direction of the projection offset is a hypotenuse 5006 580 of a right triangle 5004 with a leg 5005 coincident to the display in the apparent view plane. As the variable planes of triangles of each edge triangle curve into the display plane the centroids 4002 of the triangles converging with the location of the peak point define the origin of offset projections. Angles are calculable to infinitesimal magnitudes. Where the origin of the triangles are located it is possible to calculate offsets either on an edge 5002 feature or a contour edge 5003 that has been arbitrarily generated over the triangle centroids. A signature representation of the contour geometric and pixilated parameters exists in blocks of primitive structure and likewise exist in a robust pixel to block form. Similarly, one or more digital images used in modeling edge offsets of two objects or concurrent virtual models is directly applicable to surface modeling.

Approximating the position of edge feature blocks in three dimensions has a coarseness associated with it that may leave minute jagged edges in the first attempt at calculating depth. Smoothness is derived from reconnecting 581 peak points that are smoothed by cross referencing the surface contours with the registered distance location of the edges. A suggestion of the vector position that would be relatively smooth is derivable from organizing contours and edges as the projection of Simpson's Rule intervals [3] FIG. 4. Being able to project the edge features into the interior of an edge or block solid is useful for calculating refinements in depth projection across the boundaries of blocks. In the intervals the corners 5001 of the parametrically smooth section elements are directly comparable to the basic arc building blocks of primitives providing tangent vectors to qualify the edge locations with. By having this interchangeability available the pixilated block representations are refined in a two dimensional view plane both in terms of edges and surfaces.

The primitives are proportional. In context to the inductive logic connected with the transformation matrices, the definition of edge features are used to instantiate the process, build primitive relations for combining multitudes of edge features at meaningful depth projections, and finally combining edges on primitives representing very small variations in depth features. A database containing this information is practically derived from common digital images. The implementation of this process on a digital computer is practical given the pixilated and round off error inherent in digital computing provides the basis for defining blocks. Corresponding features are skew to an infinitesimal amount providing space by which to infer primitives shaped by this process.

Images taken of spurious feature coloration must be processed in order to make the determination of where edge features are located. Manually altering an image is practical because the software process of edge detection functions well even in boundary areas of fuzzy coloration. Further, the primitive edge representations are built from continuation of features in successive images of a block. A record of the overlays 500 projection of blocks 520 and 555 reduction of edge features is the base for continuous return to the elemental image of black and white edge feature regions. Manual coloration of three dimensional regions exemplified by corner vertices requires more than one RGB color. Resolution reduction outside of black and white is not a hindrance to the process of measurement because the base case depth calculation 580 is made using black and white images of lower hierarchy simpler base case elements.

Scalability makes this device highly dependable across a typical range of application environments. Industrial settings, inexpensive cameras, varying sizes of computer displays, and freely placed camera positions are factors that do not decrease the efficacy of the model measurement results. Included in the scaled device properties is the equivalent substitution of pixels to blocks and corresponding blocks to pixels. This functionality is carried to animated graphics models of parts created from coarse images in computerized animation. Moving from one device to another is analogous to building images from sparse data.

The terms used herein include various terms that are used in the art. The meaning of these terms and the use of these terms is consistent with the following definitions:

Cartesian Axis [MATH]

one of a set of mutually perpendicular lines which all pass through a single point, used to define a Cartesian coordinate system; the value of one of the coordinates on the axis is equal to the directed distance from the intersection of axes, while the values of the other ordinance vanish. McGraw-Hill Dictionary of Scientific and Technical Terms copyright 1976.

Cartesian Coordinates [MATH]

the set of numbers which locate a point in space with respect to a collection of mutually perpendicular axes. McGraw-Hill Dictionary of Scientific and Technical Terms copyright 1976.

Cartesian Coordinate System [MATH]

A coordinate system in n dimensions where n is any integer made by using n number axes which intersect each other at right angles at an origin, enabling any point within that rectangular space to be identified by the distance from the n lines. Also known as rectangular Cartesian coordinate system. McGraw-Hill Dictionary of Scientific and Technical Terms copyright 1976.

Fiducial

In physics and 3D computer graphics, fiducials are reference points: fixed points or lines within a scene to which other objects can be related or to which objects can be measured against.

In applications of augmented reality or virtual reality, fiducials are often manually applied to objects in the scenery to recognize these objects in images of the scenery. For example, to track some object, a light emitting diode can be applied to it. With the knowledge of the color of the emitted light, the object can easily be identified in the picture.

In PCB (printed circuit board) design fiducial marks, also referred to as circuit pattern recognition marks, allow automated assembly equipment to locate the circuit pattern by providing common measurable points. They are usually made by leaving a spot of the board bare with a bare copper, nickel or solder coated dot inside. Wikipedia, A user-contributed encyclopedia Fiducial Point [OPTICS]

a mark, or one of several marks, visible in the field of view of an optical instrument, used as a reference or for measurement. Also known as fiduciary point. McGraw-Hill Dictionary of Scientific and Technical Terms copyright 1976.

Vertex http://en.wikipedia.org/wiki/Vertex

In geometry, a vertex (Latin: whirl, whirlpool; plural vertices) is a corner of a polygon (where two sides meet) or of a polyhedron (where three or more faces and an equal number of edges meet).

In graph theory, a graph describes a set of connections between objects. Each object is called a node or vertex. The connections themselves are called edges or arcs.

In 3D computer graphics, a vertex is a point in 3D space with a particular location, usually given in terms of its x, y, and z coordinates. It is one of the fundamental structures in polygonal modeling: two vertices, taken together, can be used to define the endpoints of a line; three vertices can be used to define a planar triangle. Many people confuse vertices with vectors because they can be described with the same properties. They are, however, two completely different things.

Inductive Logic http://plato.stanford.edu/entries/logic-inductive/

An inductive logic is a system of reasoning that extends deductive logic to less-than-certain inferences. In a valid deductive argument the premises logically entail the conclusion, where such entailment means that the truth of the premises provides a guarantee of the truth of the conclusion. Similarly, in a good inductive argument the premises should provide some degree of support for the conclusion, where such support means that the truth of the premises indicates with some degree of strength that the conclusion is true. Presumably, if the logic of good inductive arguments is to be of any real value, the measure of support it articulates should meet the following condition:

Criterion of Adequacy (CoA):

As evidence accumulates, the degree to which the collection of true evidence statements comes to support a hypothesis, as measured by the logic, should tend to indicate that false hypotheses are probably false and that true hypotheses are probably true.

Multiply Connected http://mathworld.wolfram.com/MultiplyConnected.html

A set which is connected but not simply connected is called multiply connected. A space is n−1 multiply connected if it is n+1 connected and if every map from the n-sphere into it extends continuously over the −disk . . . ;

Contour http://www.highbeam.com/library/search.asp?ctrlInfo= Round11%3AProd%3ASR%3ASearch&FN=SS&search_ newspapers=off&search_magazines=off&search_books= off&search_transcripts=off&search_maps=off&search_ images=off&search_encyclopedias=off&search_dictionaries=on&search_almanacs=off&q=contour&submit.x= 30&submit.y=13&submit=submit 1. Contour Webster's NewWorld Dictionary; Jan. 1, 1988

. . . mass, land, etc. 2. the representation of such an outline—vt. 1. to make a contour or outline of 2. to mark contour lines on 3. to shape or mold to conform to the contour of something {a chair contoured to fit the body} 4. to construct (a road . . .

Registration http://bishopw.lonLucla.edu/AIRS/

AIR allows automated registration of 3D (and 2D) images within and across subjects and within and sometimes across imaging modalities. AIR source code written in C is available to the research community free of charge. The code can be compiled for UNIX, PC or Macintosh platforms. Only source code is available (no executables).

Intrasubject registration of brain images uses a rigid-body model. Intermodality registration has been validated for some (MRI-PET), but not all modalities. Intersubject registration can be performed using any of a variety of linear or nonlinear models to register different subjects to one another or to an atlas template (for example, an averaged brain in "Talairach space"). These models may also be useful for intrasubject registration of organs that are more deformable than brain or for tracking intrasubject developmental changes over time.

Resolution

Techweb (1) The degree of sharpness of a displayed or printed character or image. On screen, resolution is expressed as a matrix of dots. For example, the VGA resolution of 640×480 means 640 dots (pixels) across each of the 480 lines. Sometimes the number of colors are added to the spec; for example, 640× 480×16 or 640×480×256. The same resolution looks sharper on a small screen than a larger one. See how to select a PC display system and PC display modes.

For printers and scanners, resolution is expressed as the number of dots per linear inch. 300 dpi means 300×300, or 90,000 dots per square inch. Laser printers and plotters have resolutions from 300 to 1000 dpi and more, whereas most display screens provide less than 100 dpi. That means jagged lines on screen may smooth out when they print. Scanners have both an optical (physical) resolution and an interpolated resolution, which is computed (see scanner). See lines of resolution.

Conic http://www.geom.uiuc.edu/docs/reference/CRC-formulas/node26.html

Figure 1B:
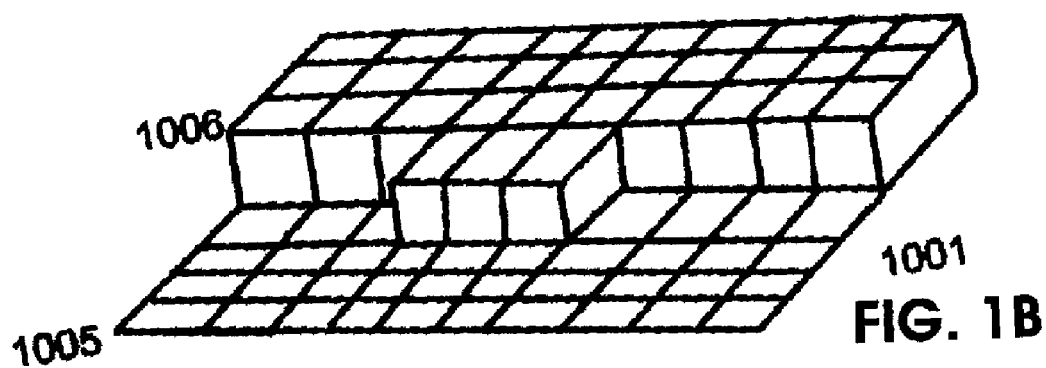
FIG. 1B is a diagrammatic view of the average height of contrasting pixels in blocks located at the approximate position of the edge features.
Figure 1A:
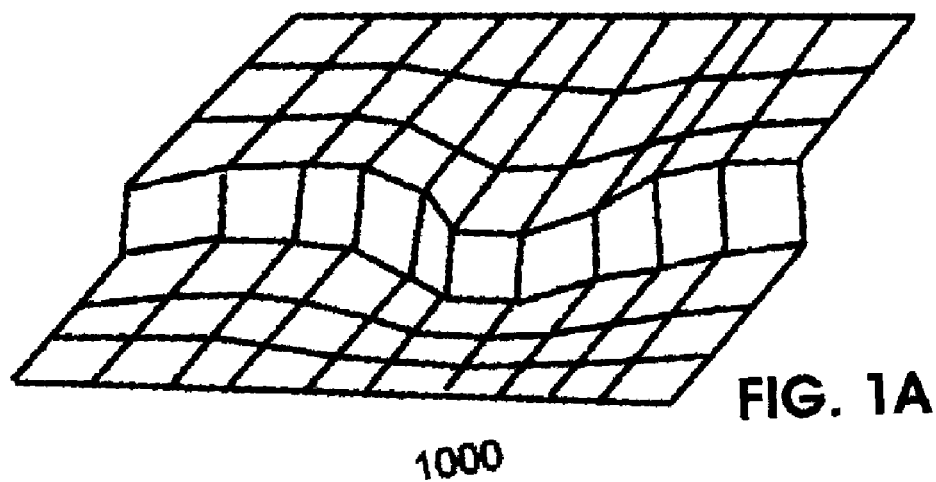
FIG. 1A is a diagrammatic view of a matrix of points projected onto a display in determining the approximate position of edge features through pixels of contrasting brightness.
Figure 2:
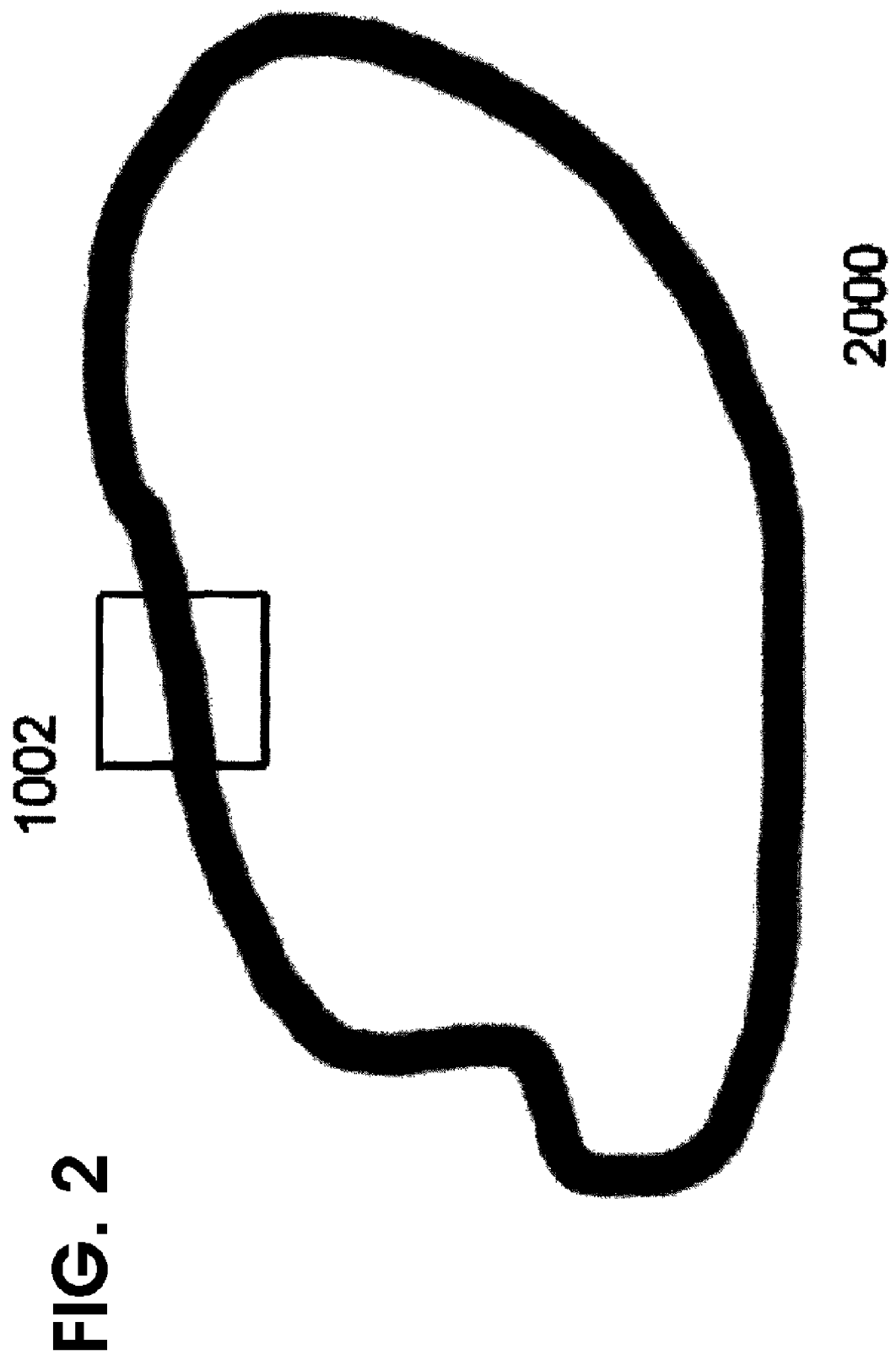
FIG. 2 is diagrammatic view of an approximate edge outline with refinement grid.
Figure 3:
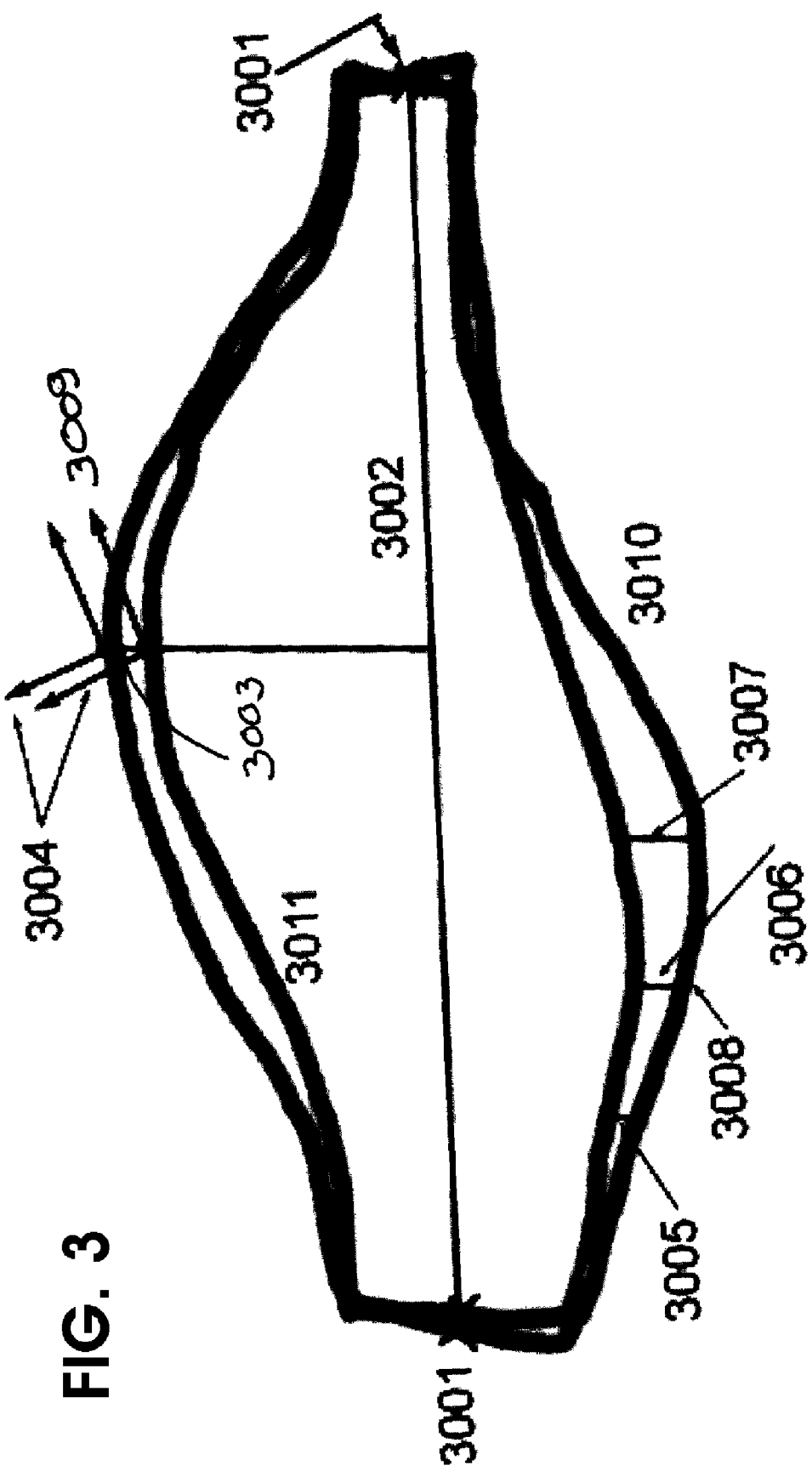
FIG. 3 is a diagrammatic view of a base case and comparator edge feature overlays with offsets on local coordinates.
Figure 4:
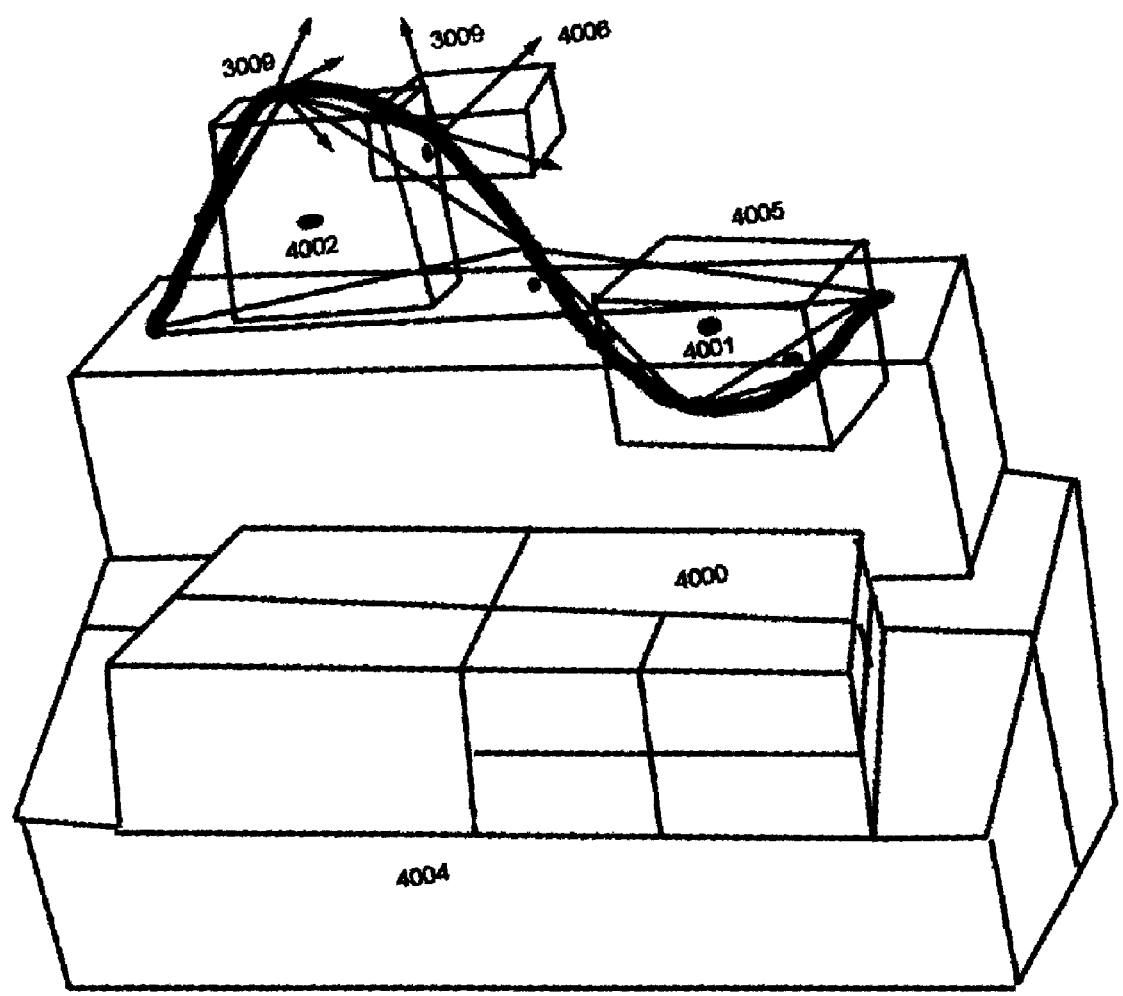
FIG. 4 is a diagrammatic view of course boxed refined into triangle edge feature planes of blocks at the centroid of the triangles.
Figure 5:
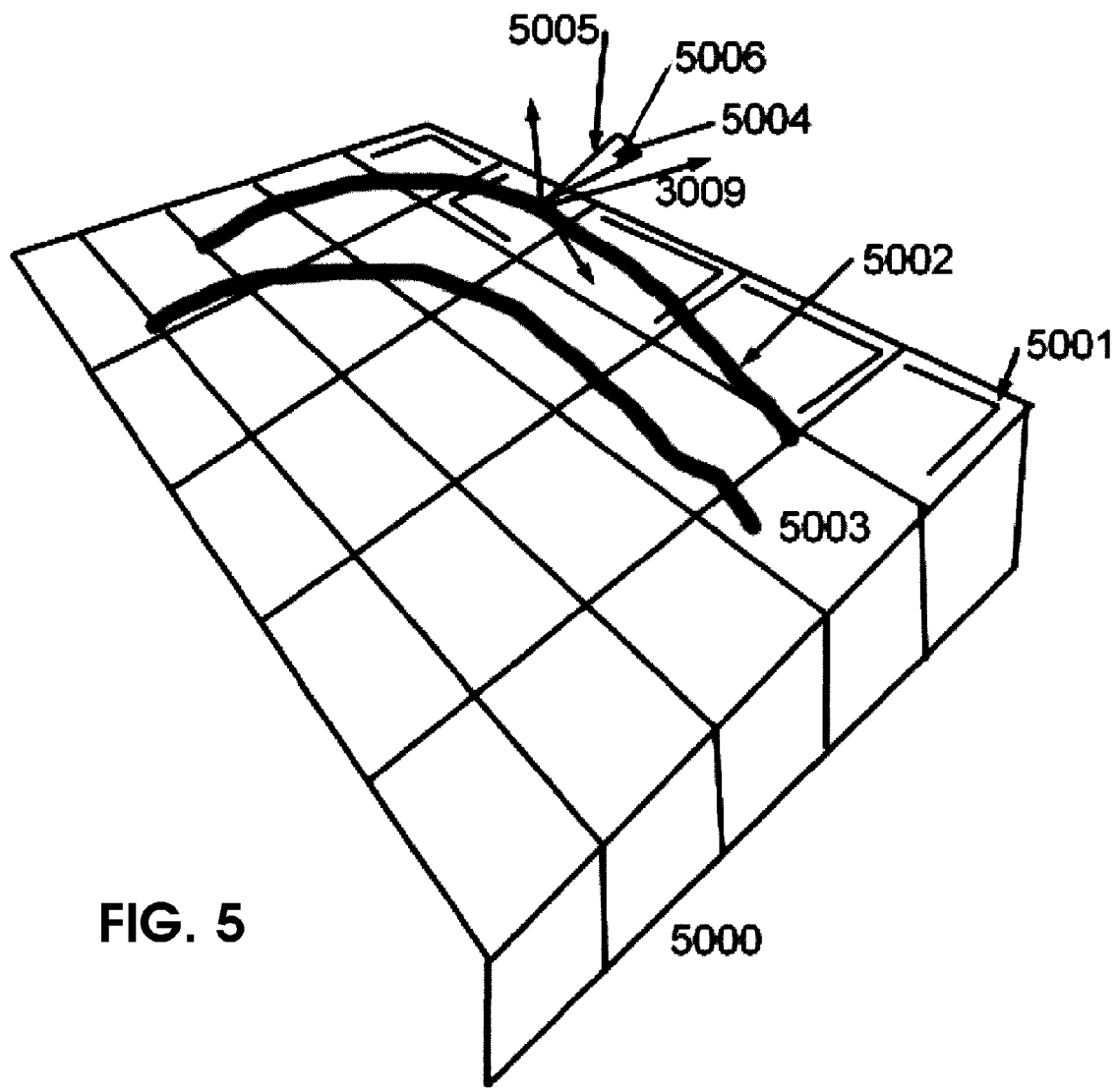
FIG. 5 is a diagrammatic view of Simpson's interval on edge and contour features for determining surface depth.

A conic (or conic section) is a plane curve that can be obtained by intersecting a cone (Section 13.3) with a plane that does not go through the vertex of the cone. There are three possibilities, depending on the relative position of the cone and the plane (FIG. 1). If no line of the cone is parallel to the plane, the intersection is a closed curve, called an ellipse. If one line of the cone is parallel to the plane, the intersection is an open curve whose two ends are asymptotically parallel; this is called a parabola. Finally, there may be two lines in the cone parallel to the plane; the curve in this case has two open pieces, and is called a hyperbola.

Figure 6:
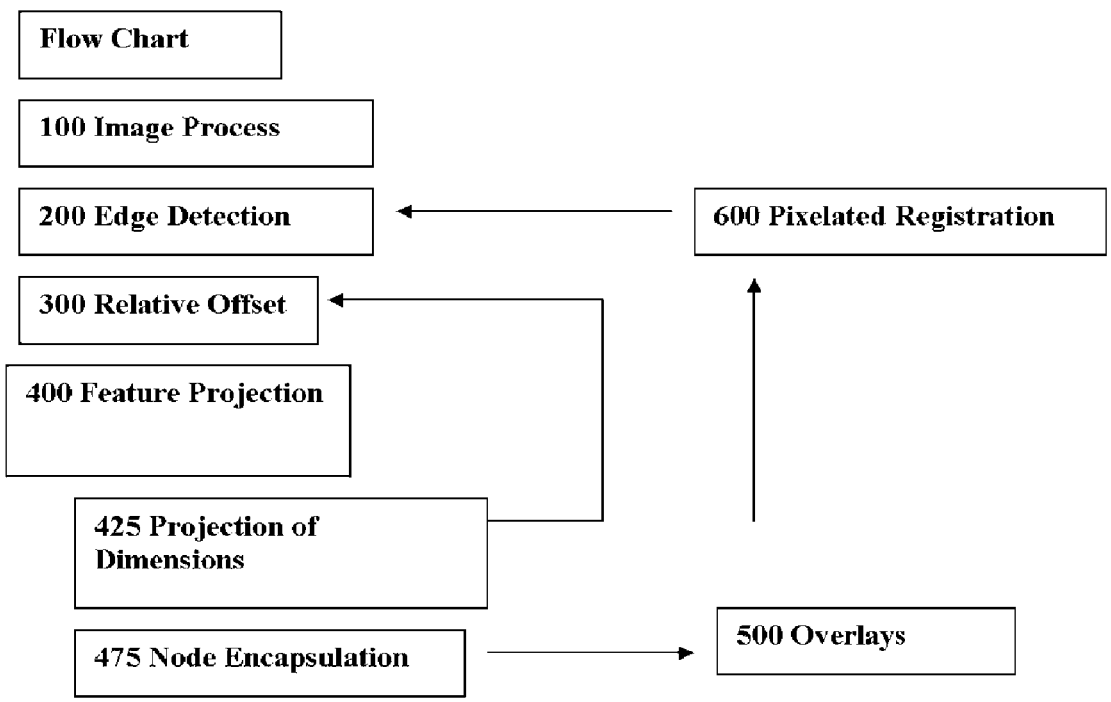
FIG. 6 is a schematic diagram of an electronic computer system in which a preferred embodiment of the invention is implemented.

The respective methods and systems in accordance with the present system may utilize a computer that includes a microprocessor and memory and which cooperates with software that is commercially available or within the skill of practitioners in the programming arts. FIG. 6 shows, interconnected, a light pen or mouse 2, keyboard 1, processor (e.g., CPU, etc.) external memory 6, display 4 and printer 5, in which the instant invention may be implemented.

The invention also encompasses an article of manufacture including a computer useable medium having a computer readable code means embodied in said medium for image recognition of a material object, the computer readable program code in said article of manufacture comprising: computer readable program code for causing the computer to project a point on a digital display to an inward depth, a ½ pixel distance in the plane of the display, with a conic to a digital display, and a square block containing ½ size child blocks that are scaled to depth; computer readable program code for causing the computer to project the corner points of a vertex; and computer readable program code for causing the computer to substitute bisecting points of edge features detected in a digital display scaled at an increasing rate of congruency to the dimensions of an object.

Similarly, the invention also includes a program storage device readable by a machine, tangibly embodying a program of instructions executable by the machine to perform method steps for image recognition of a material object that utilizes graphical modeling of the corner points of a vertex, said method steps including: projecting a point on a digital display to an inward depth, a ½ pixel distance in the plane of the display, with a conic to a digital display, and a square block containing ½ size child blocks that are scaled to depth; projecting the corner points of a vertex; and replacing the bisecting points of edge features detected in a digital display scaled at an increasing rate of congruency to the dimensions of an object.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompass other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

100 Image Process

110 Patterns of features filled with continuous dark RGB color

120 Boundary space of patterns filled with light RGB color (relative to 100)

130 Distinct colors as white, black, red, green, blue RGB color fills 3d corner vertex feature patterns.

140 Contrast and brightness are adjusted for increasing feature resolution.

200 Edge Definition

210 Grid of isosceles triangles maps the relative height of pattern boundaries.

220 An approximate outline of edge features is generated at the grid lines intersecting the half height between bright and dark patterns.

221 Generate n×m grid over image view display

222 Calculate intersection points of half height image on each block

223 Store the points as a line segment.

230 Edge features are segmented into smaller screen sections to the grid dimensions at 2× (or greater) the image pixel resolution.

240 An average grid of blocks at high (light) and low (dark) heights is set a the patch grid intervals.

250 A second grid is generated from the block intervals.

251 Generate n×n isosceles triangle grid to the 2× (or greater) the image pixel resolution.

260 The edge feature at the patch is refined to the 220 half height scaled blocks will be the ½ height in and out of display.

270 Spurious features are removed against a full screen block grid of triangulated features

221 Generate n×m grid over image view display.

271 Two points are selected from 260 the refined collection of edge features.

272 Triangles are projected for correlating peak points onto edge features.

273 Outward points have block path of connectivity from base points to peaks.

274 Successful projection of 273 marks blocks.

275 Edge features contained in blocks as inward hidden lines are removed.

300 Relative Offset

301 Fiducial points gotten from 600 registration are projected onto edge feature display.

302 Points are projected onto edge features.

303 User manually adjusts fiducial points through an interactive computer display.

304 User selects compatible location half way on distance of detected edge.

310 Two patterns (or base case and comparator case) of edge features are overlayed in the display plane by the two pairs matching fiducial points.

311 Two dimensional flat comparator features are overlayed and combined on the connectivity from 273 with the base case edge features.

325 Symmetry Intervals

375 Depth Half Angle

325 Symmetry Intervals

335 The perpendicular axis to the line through a pair of fiducial points is overlayed on both images.

337 Projection points are set on the intersection points of the perpendicular at edge feature intersections.

345 Two local Cartesian coordinate axis are set at both intersection points.

347 The relative offset of the overlayed difference (between the overlayed edges) is separated into 3 levels of deviation high, low, mid range.

375 Depth Half Angle

385 The arc quadric angular offset is calculated from base case conic arc data and reprojected into the screen.

395 The cubic in and out screen depth offset is calculated from the combined offset of two data base conic arc data.

397 Two d (325) symmetric offset of a pair of image features over the ½ edge decomposition directions of symmetry 397.1 A Cartesian coordinate axis from 345 of the comparator 311 is projected into the block depth in an affine transformation.

397.2 Locate the larger section of a pair in the highest rise run section on the feature of 273.

397.3 Offset the depth of the feature pair 273 with the largest projected to the inward arc conic 385 maintain coplanar offset of remaining pair of the smaller section.

425 Removal Of Perspective

435 Calculate the offset of the projected features from 337 on relative offset from 347 the ½ edge decomposition directions.

445 Locate the position of the normal distribution of (bell curve) of the perspective distortion on the image edge features.

455 Remove the perspective distortion leaving the adjacent smaller spiked normal—bell curve—and increasing incline deviation about in the symmetry 435 along the adjacency.

465 Maximum deviations are sorted and highlighted to the least deviation by the rise run projection, that are separate unconnected sections along a feature, and project outward from the feature.

467 The deviations are sorted and highlighted to the least deviation.

467.1 Separate the remaining smaller spike normal distributions.

347 The relative offset of the overlayed difference (between the overlayed edges) is separated into 3 levels of deviation high, low, mid range.

475 Node Encapsulation

495 Use the position and orientation of the newly detected edge features to identify the primitive out of the display.

497 Determine projection uniformity within a volume array of block edge feature with detected edge feature blocks.

498 Compare data base primitive blocks to the pattern of this image edge feature block.

498.1 The node space and child elements holding primitives is expanded from vertex base elements to common other base element parent (Similar to 270)

499 Make block convergence holding coordinate axis in aligned orientation that fit within surrounding volume context of the base case primitive blocks.

499.5 Set relative depth of feature centroids in plus or minus block directions qualifying the feature orientation to the display plane in overlays 310.

499.6 Measure orientation as qualification of projection points of feature centroids to the display plane qualifying features in preparation of 311.

397.1 A Cartesian coordinate axis from 3454 of the comparator 311 is projected into the block depth in an affine transformation.

500 Overlays

510 Nodes of primitives are separated into composite volumes.

515 Reduction of complexity in primitives in existing base case linear depth [T][1] as plus to minus axis block alignment in volume array.

515.1 Maintain consistency of block features in limit of a base line volume array plus to minus axis block alignment with generic continuity.

516 Scale block from 395 to ½ increment from of feature projected on both centroids.

517 Apply centroid registration condition of the feature level.

517.1 Measure convergence of projected centroids to corresponding base case and comparator blocks in 2d display plane.

530 Multiply connected regions detected from the overlay node connectivity 495.

555 Comparator blocks are translated by the local axis to an affine transformation 345 to positions relative to base case volumes.

556 Block centroids converge to outer triangles.

397.1 A Cartesian coordinate axis from 3454 of the comparator 311 is projected into the block depth in an affine transformation.

557 Qualify the translation with condition on 2d block topology.

540 Make multiply connected regions outside of the current image display.

570 Surface edge features are gridded (using suitable method .e.g isosceles triangles) across the corresponding edge features related to 425-467

580 Calculations of right angle line of sight on triangle axis as alignment with direction cosine of the angle [1] between blocks in composite surfaces (edges become surfaces)

581 The inward projection is qualified over a Simpson's integral decomposition as the rise run of edge features permit measurement to within a straight line feature inside of the lattice registered tolerance.

582 Projection direction is calculable from db [T][2] primitives.

397.1 A Cartesian coordinate axis from 3454 of the comparator 311 is projected into the block depth in an affine transformation.

600 Pixelated Registration

610 Pixelated Record
660 Registration.
610 Pixelated Record
612 Color brightness (RGB) of the raw image is pixilated and set on image edge feature centroids.
613 Average RGB pixel coloration at centroid in n×n pixel area.
618 Brightness, color (RGB) and either useful parameter of light combined for describing the image feature attributes.
660 Registration.
670 The grid of geometric figures of pixilated light parameters are registered to a new image.
680 Overlay of similar geometric figures in the pixelated image record are used to start process at 200 for building new image model features.
681 Two pixilated image displays are compared for measuring similarity in light parameters of a database and comparator record.
682 Sort the similar matches of pixilated data for qualification by edge feature dimensional comparison.

What is claimed is:

1. A method for image recognition of a material object that utilizes graphical modeling of corner points of a vertex which comprises:
projecting using a central processing unit, a point on a digital display to an inward depth, a ½ pixel distance in the plane of the digital display, with a conic to the digital display, and a square block containing ½ size child and blocks that are scaled to depth;
projecting the corner points of the vertex;
detecting edge features and the corner points in the digital display;
identifying bisecting points of the edge features in the digital display and replacing the bisecting points of edge features detected in the digital display scaled at an increasing rate of congruency to the dimensions of the material object.

2. The method as described in claim 1 further including:
producing a digital image of the material object;
providing memory associated with the central processing unit;
providing a display associated with the central processing unit;
loading the digital image into the memory;
defining the edges of features within the digital image; and
defining fiducial points from registrations projected onto an edge feature display.

3. The method as described in claim 2 further including:
overlaying perpendicular axes to a line through a pair of fiducial points; and
setting projection points on the intersection points of the perpendiculars and edge features.

4. The method as described in claim 3 further including:
determining the relative offset of the perpendicular axes;
separating the relative offset of the perpendicular axes into levels of deviation;
calculating the arc quadric angular offset from a base case conic arc data database including data on a plurality of base case conic arcs and projecting the arc quadric angular offset data onto a display screen; and
producing two-dimensional offsets of respective image features of the material object and the base case conic base case conic arcs.

5. The method as described in claim 4 further including:
detecting edge features on the digital display;
calculating the offset of the projected features of half edge decomposition directions of symmetry;
locating the position of a normal distribution of the perspective distortion on the image edge features;
removing the perspective distortion offset and eliminating the highest calculated offsets of the projected features of the half edge decomposition direction of symmetry;
sorting maximum deviations and highlighting least deviations; and
using the position and orientation of the detected edge features to identify a primitive on a display.

6. The method as described in claim 5 further including:
determining a projection repeatable pattern of block edge features with detected edge feature blocks;
comparing database primitive blocks to the pattern of image edge feature blocks to provide an affine transformation;
expanding the node space and child elements including primitives as increments of patterns to a common based parent;
defining block convergence holding coordinate axes and aligning orientation that fits within the collective volume of the base case primitive blocks;
and separating nodes of primitives into composite volumes.

7. The method as described in claim 6 further including:
reducing the complexity of primitives with respect to existing base case linear depth;
scaling each block to one half of the primitive thereof and dividing the blocks in half in a hierarchy of features projected on centroids of comparator features;
detecting multiply connected regions from the overlay node connectivity producing corner vertex points of one or more hidden edges;
translating comparator blocks to positions relative to volumes;
converging block centroids to outer triangles; and
confirming registration of the translation on two-dimensional block topology.

8. The method as described in claim 7 wherein the scaling step includes registering the edge features defining surface grid edge features; and
the translating step includes registering the edge features.

9. A method as described in claim 1 further including:
manually adjusting fiducial points utilizing an interactive computer display.

10. A method as described in claim 3 further including:
setting projection points on the intersection points of the perpendicular axes and edge feature intersections; and
setting projection points to local Cartesian coordinate axes at both intersection points.

11. A method as described in claim 1 further including:
detecting edge features in the display; and
using the position and orientation of the detected edge features to identify a primitive on a display.

12. A method as described in claim 1 wherein:
the detecting edge features and corner points in the digital display step includes manually selecting respective midpoints of respective detected edge features.

13. A method for measuring the dimensions of a material object by graphical modeling of corner points of a vertex which comprises:
providing an electronic computer, the electronic computer including a memory and a digital display having stored therein instructions and data for performing steps (a)-(e);
performing the steps (a)-(e) by means of executing the instructions and data within the computer;

(a) projecting a point on the digital display to an inward depth, a ½ pixel distance in the plane of the display, with a conic to a digital display, and a square block containing ½ size child blocks that are scaled to depth;

(b) detecting the corner points on the material object;

(c) detecting edge features on the digital display (d) defining bisecting points of the detected edge features and (e) projecting the corner points of the vertex to be coincident with the bisecting points of the edge features detected in the digital display scaled at an increasing rate of congruency to the dimensions of the material object.

14. A method as described in claim 13, wherein the memory further includes instructions and data for performing steps (f)-(j) in the computer system:

(f) producing a digital image of the material object;

(g) providing a display associated with the central processing unit;

(h) loading the digital image into the memory;

(i) defining the edges of features within the digital image; and (j) defining fiducial points from registrations projected onto an edge feature display.

15. A method as described in claim 13 wherein the memory further includes instructions and data for performing steps (k)-(m) in the computer system:

(k) overlaying a perpendicular axes to a line through a pair of fiducial points;

(l) setting projection points on the intersection points of respective perpendicular axes and edge feature intersections; and (m) separating the relative offset of the overlaid edges into levels of deviation.

16. A method as described in claim 13 wherein the memory further includes instructions and data for performing steps (k)-(q) in the computer system:

(k) providing a base case conic arc database including data on a plurality base case conic arcs, and calculating the arc quadric angular offset with respect to base case conic arc data in the database including data on a plurality of base case conic arcs and projecting this data onto a display screen;

(l) calculating a cubic in and out screen depth offset from the combined offset of two database conic arc data;

(m) producing a two-dimensional symmetric offset of a pair of image features perpendicular to intersection points on an edge feature;

(n) calculating the offset of the projected features of the half edge decomposition directions of symmetry;

(o) locating the position of the normal distribution of the perspective distortion on the image edge features;

(p) removing the perspective distortion and increasing the incline deviation about the symmetry of the normal distribution;

(q) sorting maximum deviations and highlighting least deviations; and using the position and orientation of the detected edge features to identify a primitive on the display screen.

17. An article of manufacture comprising:

a computer storage medium having a computer readable code means embodied in said medium for image recognition of a material object when executed by a central processing unit, the computer readable program code in said article of manufacture comprising:

computer readable program code for causing the computer to project a point on a digital display to an inward depth, a ½ pixel distance in the plane of the display, with a conic to the digital display, and a square block containing ½ size child blocks that are scaled to depth;

computer readable program code for causing the computer to project corner points of a vertex of an associated material object; and computer readable program code for causing the computer to replace bisecting points of edge features detected in the digital display scaled at an increasing rate of congruency to the dimensions of the associated material object.

18. A program storage device readable by a machine, tangibly embodying a program of instructions executable by the machine to perform method steps for image recognition of an associated material object that utilizes graphical modeling of the corner points, said method steps comprising:

detecting corner points on the associated material objects;

detecting edge features in the digital display;

defining bisecting points of the detected edge features;

projecting a point on a digital display to an inward depth, a ½ pixel distance in the plane of the display, with a conic to a digital display, and a square block containing child blocks that are scaled to depth;

projecting the corner points of the vertex of the associated material object; and replacing the bisecting points of the edge features detected in a digital display scaled at an increasing rate of congruency to the dimensions of the associated material object.

19. A method for constructing a replica of a material object utilizing the following method steps:

projecting, using a central processing unit, a point on a digital display to an inward depth, a one half pixel distance in the plane of the display, with a conic to a digital display, and a square block containing child blocks that are scaled to depth;

projecting corner points of the material object; and replacing bisecting points of the edge features detected in the digital display scaled at an increasing rate of congruency to the dimensions of the material object.

* * * * *